(12) United States Patent
Kawata (10) Patent No.: US 9,370,996 B2
(45) Date of Patent: Jun. 21, 2016

(54) INTAKE DUCT DEVICE OF MOTORCYCLE

(71) Applicant: SUZUKI MOTOR CORPORATION, Hamamatsu-shi, Shizuoka (JP)

(72) Inventor: Koichiro Kawata, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 0 days.

(21) Appl. No.: 14/539,090

(22) Filed: Nov. 12, 2014

(65) Prior Publication Data
US 2015/0136511 A1    May 21, 2015

(30) Foreign Application Priority Data

Nov. 18, 2013   (JP) .................................. 2013-238068

(51) Int. Cl.
| | |
|---|---|
| *B62K 11/00* | (2006.01) |
| *B60K 13/02* | (2006.01) |
| *F02M 35/16* | (2006.01) |
| *F02M 35/10* | (2006.01) |
| *B62K 11/06* | (2006.01) |
| *B62K 19/32* | (2006.01) |

(52) U.S. Cl.
CPC .................. *B60K 13/02* (2013.01); *B62K 11/06* (2013.01); *B62K 19/32* (2013.01); *F02M 35/10013* (2013.01); *F02M 35/10144* (2013.01); *F02M 35/161* (2013.01); *F02M 35/162* (2013.01)

(58) Field of Classification Search
CPC ......... B62K 11/00; B62J 17/02; F02M 35/00; F02M 35/02; F02M 35/04; F02M 35/044; F02M 35/048; F02M 35/10; F02M 35/10039; F02M 35/10032; F02M 35/10091
See application file for complete search history.

(56) References Cited

U.S. PATENT DOCUMENTS

| | | | | |
|---|---|---|---|---|
| 5,577,570 | A * | 11/1996 | Shiohara .................. | B62J 17/00 180/219 |
| 6,422,332 | B1 * | 7/2002 | Takata ..................... | F02B 61/02 123/41.01 |
| 7,264,072 | B2 * | 9/2007 | Yoshikawa ............. | F02M 35/04 123/184.21 |
| 7,380,624 | B2 * | 6/2008 | Momosaki ....... | F02M 35/10013 180/68.3 |
| 2004/0050357 | A1 * | 3/2004 | Idei ......................... | F02B 61/02 123/198 E |
| 2005/0051375 | A1 | 3/2005 | Momosaki | |
| 2006/0219201 | A1 * | 10/2006 | Seki ................. | F02M 35/10013 123/184.55 |

(Continued)

FOREIGN PATENT DOCUMENTS

| | | | | |
|---|---|---|---|---|
| JP | 2007-196984 | | 8/2007 | |
| JP | EP 2206911 A1 * | | 7/2010 | ............. B62K 11/04 |
| TW | EP 2103511 A1 * | | 9/2009 | ............. B62K 11/06 |

OTHER PUBLICATIONS

German Office Action dated Aug. 3, 2015 issued in corresponding German Patent Application No. 102014116817.8.

*Primary Examiner* — Joseph Rocca
*Assistant Examiner* — Daniel Yeagley
(74) *Attorney, Agent, or Firm* — Troutman Sanders LLP (57) ABSTRACT

An engine is mounted on a body frame extending from a steering head pipe toward a vehicle rear side slightly downward and an air cleaner is disposed above the engine. An intake duct device includes an intake duct which leads traveling air taken from a front surface of a cowling to the air cleaner so as to make the traveling air pass along both side surfaces of the steering head pipe. The intake duct is made of a separate component from the body frame, is two-divided into a front intake duct and a rear intake duct so as to surround the steering head pipe from front and rear sides, and is fixed to the body frame by fastening.

5 Claims, 13 Drawing Sheets

(56) References Cited

U.S. PATENT DOCUMENTS

| | | | |
|---|---|---|---|
| 2007/0144802 A1* | 6/2007 | Tsuya | B62K 11/04 180/68.2 |
| 2007/0149105 A1 | 6/2007 | Nakagome et al. | |
| 2014/0090912 A1* | 4/2014 | Kontani | B62K 11/00 180/68.3 |

* cited by examiner

VIEW:X

SECT:III-III

INTAKE DUCT DEVICE OF MOTORCYCLE

CROSS-REFERENCE TO RELATED APPLICATIONS

This application is based upon and claims the benefit of priority of the prior Japanese Patent Application No. 2013-238068, filed on Nov. 18, 2013, the entire contents of which are incorporated herein by reference.

BACKGROUND OF THE INVENTION

1. Field of the Invention

The present invention relates particularly to an intake duct device that leads traveling air taken from a front surface of a cowling to an air cleaner in a motorcycle.

2. Description of the Related Art

The layout for leading intake air to an engine through the vicinity of a steering head pipe is an excellent structure in view of intake efficiency, layout efficiency of parts, and so on. As a structure of this type that passes outside air led from a front side of a body frame through an air passage that is penetratingly provided at a front portion of a body frame, one disclosed in Patent Document 1 has been known. In the structure in Patent Document 1, a member of a frame main body itself of the body frame penetrates through a steering head pipe part and is fastened to an intake duct in front thereof.

Here, since vehicles traveling on public roads generally have a large steering angle and a narrow fork pitch of a front fork, their intake ducts have a small sectional area. On the other hand, since racing vehicles and the like have a small steering angle and a wide fork pitch of a front fork, their intake ducts can have a large sectional area.

Patent Document 1: Japanese Laid-open Patent Publication No. 2007-196984

In the conventional intake duct structure in which the intake duct penetrating through the steering head pipe part is formed in the body frame itself, the sectional area of the intake duct is fixed, that is, the sectional area of the intake duct cannot be changed unless the frame main body is changed. As a typical example, it is practically impossible to cope with a requirement in such cases as when a vehicle traveling on public roads being a mass-produced vehicle is converted to a racing vehicle.

SUMMARY OF THE INVENTION

In consideration of such circumstances, it is an object of the present invention to provide an intake duct device of a motorcycle that makes it possible to change a sectional area of an intake duct without changing a frame main body.

An intake duct device of a motorcycle of the present invention is an intake duct device of a motorcycle in which an engine is mounted on a body frame extending slightly downward from a steering head pipe toward a vehicle rear side and an air cleaner is disposed above the engine, the intake duct device including an intake duct which leads traveling air taken from a cowling front surface, to the air cleaner so as to make the traveling air pass along both side surfaces of the steering head pipe, wherein the intake duct is made of a separate component from the body frame, is two-divided into a front intake duct and a rear intake duct so as to surround the steering head pipe from front and rear sides, and is fixed to the body frame by fastening.

Further, in the intake duct device of the motorcycle of the present invention, the front intake duct communicates with an air inlet opened in the cowling front surface via a fore-intake duct, and the taken traveling air passes along the both side surfaces of the steering head pipe to be sent to the air cleaner connected to a rear portion of the rear intake duct.

Further, in the intake duct device of the motorcycle of the present invention, the body frame has: upper and lower attachment surfaces for steering laces of the steering head pipe; a support post part supporting the steering lace attachment surfaces; and left and right hole parts penetrating through the twin-spar body frame in a vehicle front and rear direction, the support post part has an oval shape whose major axis is along the vehicle front and rear direction, fastening parts are provided on front and rear sides of the major axis, and the front intake duct and the rear intake duct are fastened to a front side and a rear side of the support post part via the fastening parts respectively.

Further, in the intake duct device of the motorcycle of the present invention, the intake duct branches off into left and right parts in front of the support post part, with inner sides of the intake duct being along the shape of the support post part, the left and right parts join behind the support post part, and a vicinity of a connection portion of the intake duct with the air cleaner has an intake port shape of being integrally coupled to the air cleaner.

DETAILED DESCRIPTION OF THE PREFERRED EMBODIMENTS

Hereinafter, a suitable embodiment of an intake duct device of a motorcycle in the present invention will be described based on the drawings.

Figure 1:
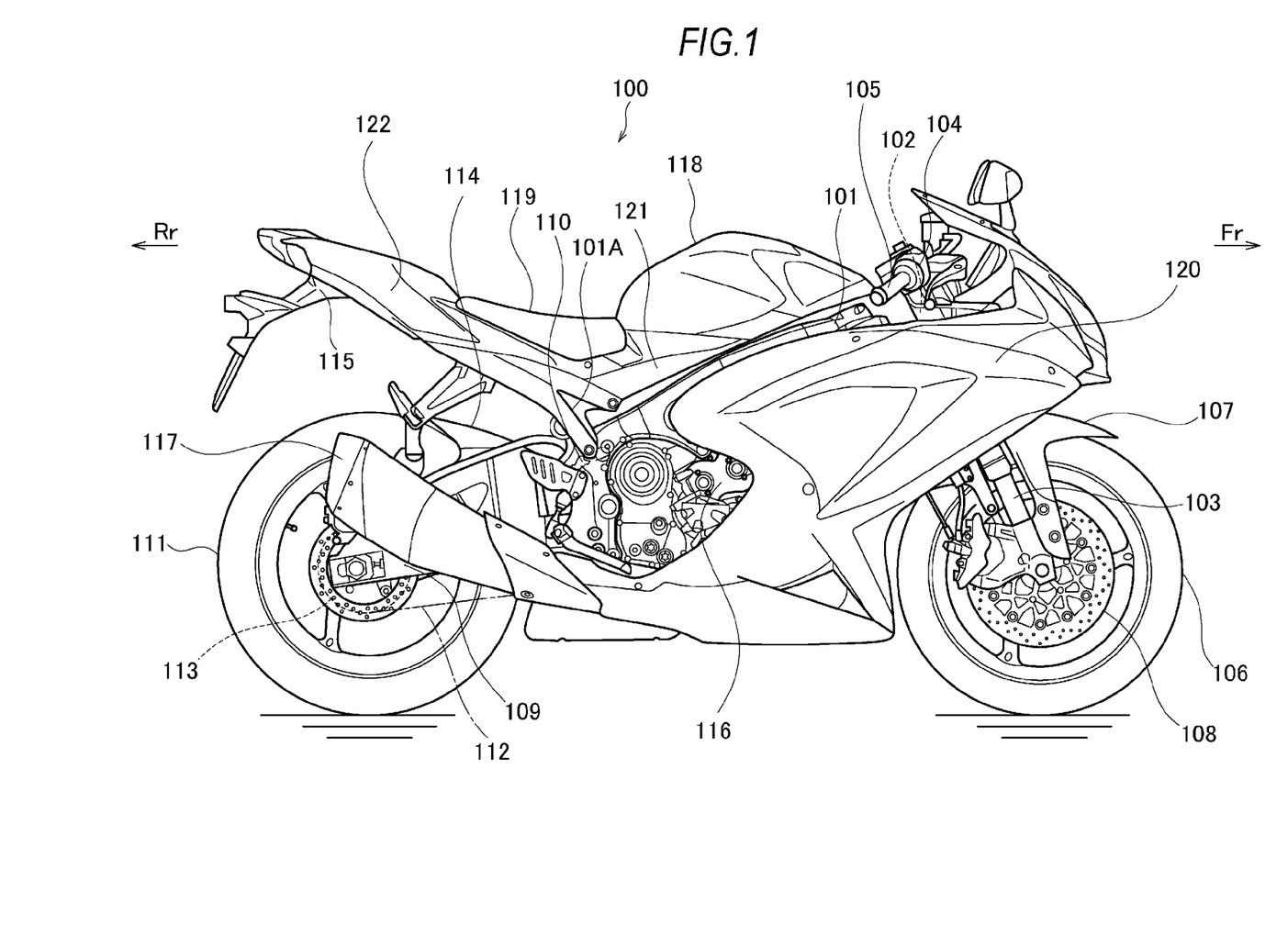
FIG. 1 is a side view of a motorcycle according to an embodiment of the present invention.

FIG. 1 is a side view of a motorcycle 100 as an application example of the present invention. First, the whole structure of the motorcycle 100 will be described by using FIG. 1. Note that in the drawings used in the description below including FIG. 1, a front direction, a rear direction, a right side direction, and a left side direction of the vehicle are indicated by an arrow Fr, an arrow Rr, an arrow R, and an arrow L respectively when necessary.

In FIG. 1, on a front portion of a body frame 101 (main frame) made of steel or an aluminum alloy material, two left and right front forks 103 which are supported by a steering head pipe 102 so as to be pivotable left and right are provided. On upper ends of the front forks 103, a handlebar 104 is fixed and grips 105 are provided on both ends of the handlebar 104. On lower portions of the front forks 103, a front wheel 106 is rotatably supported and a front fender 107 is fixed so as to cover an upper portion of the front wheel 106. The front wheel 106 has a brake disk 108 which rotates together with the front wheel 106.

The body frame 101 is integrally joined to a rear portion of the steering head pipe 102 and bifurcates rearward into a pair of left and right parts, and the body frame 101 extends from the steering head pipe 102 rear downward while fanning out. In this example, the body frame 101 is what is called a twin-spar frame which is adopted as being suitable for vehicles and the like requiring high speed performance. Incidentally, a seat rail 101A extends rearward from the vicinity of a rear portion of the body frame 101 while moderately inclining more upward as it goes more rearward, to support a later-described seat. Further, a swing arm 109 is coupled to a rear portion of the body frame 101 so as to be swingable in an up and down direction, and a rear shock absorber 110 is mounted between the body frame 101 and the swing arm 109. A rear wheel 111 is rotatably supported on a rear end of the swing arm 109. The rear wheel 111 is driven to rotate via a driven sprocket 113 around which a chain 112 for transmitting motive power of a later-described engine is wound. In the immediate vicinity of the rear wheel 111, an inner fender 114 covering the vicinity of a front upper portion of the rear wheel 111 may be provided, and above the inner fender 114, a rear fender 115 may be disposed.

An engine unit 116 mounted on the body frame 101 is supplied with an air-fuel mixture made of the air and a fuel supplied respectively from an air cleaner (this will be described later) and a fuel supply device which are not illustrated, and exhaust gas after combustion in the engine is discharged from a muffler 117 through an exhaust pipe. Above the engine unit 116, a fuel tank is mounted, and this fuel tank is covered by a tank cover 118. Behind the fuel tank, the seat 119 is continuously provided.

In the vehicle exterior, mainly a front portion and side portions of the vehicle are covered by a cowling 120 and side cowls 121 respectively, and on a vehicle rear portion, a side cover or a seat cowl 122 is mounted, and by these exterior members, a vehicle outer form having what is called a streamlined shape is formed.

Figure 2:
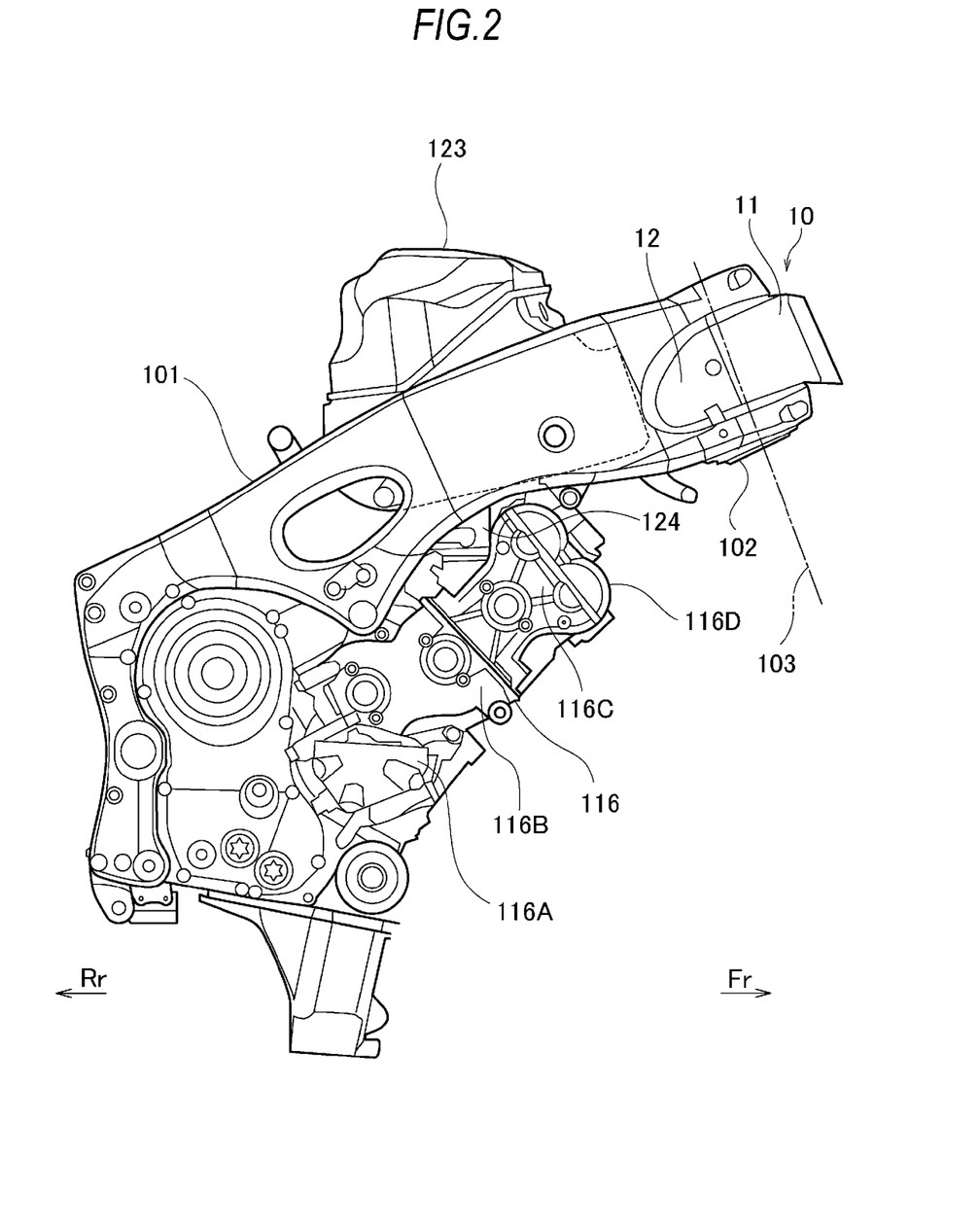
FIG. 2 is a side view of a state where an engine unit and an air cleaner are mounted on a body frame in the embodiment of the present invention.

In this embodiment, the engine of the engine unit 116 may be, for example, a four-cycle multi-cylinder engine, typically, a parallel four-cylinder engine. Here, as illustrated in FIG. 2, in the engine unit 116 in this embodiment, a cylinder 116B, a cylinder head 116C, and a cylinder head cover 116D are integrally joined in sequence on an upper portion of a crankcase 116A. Further, the engine unit 116 is suspended on the body frame 101 via a plurality of engine mounts to be thereby integrally joined to and supported by the body frame 101, and the engine unit 116 itself works as a rigid member of the body frame 101.

Figure 3:
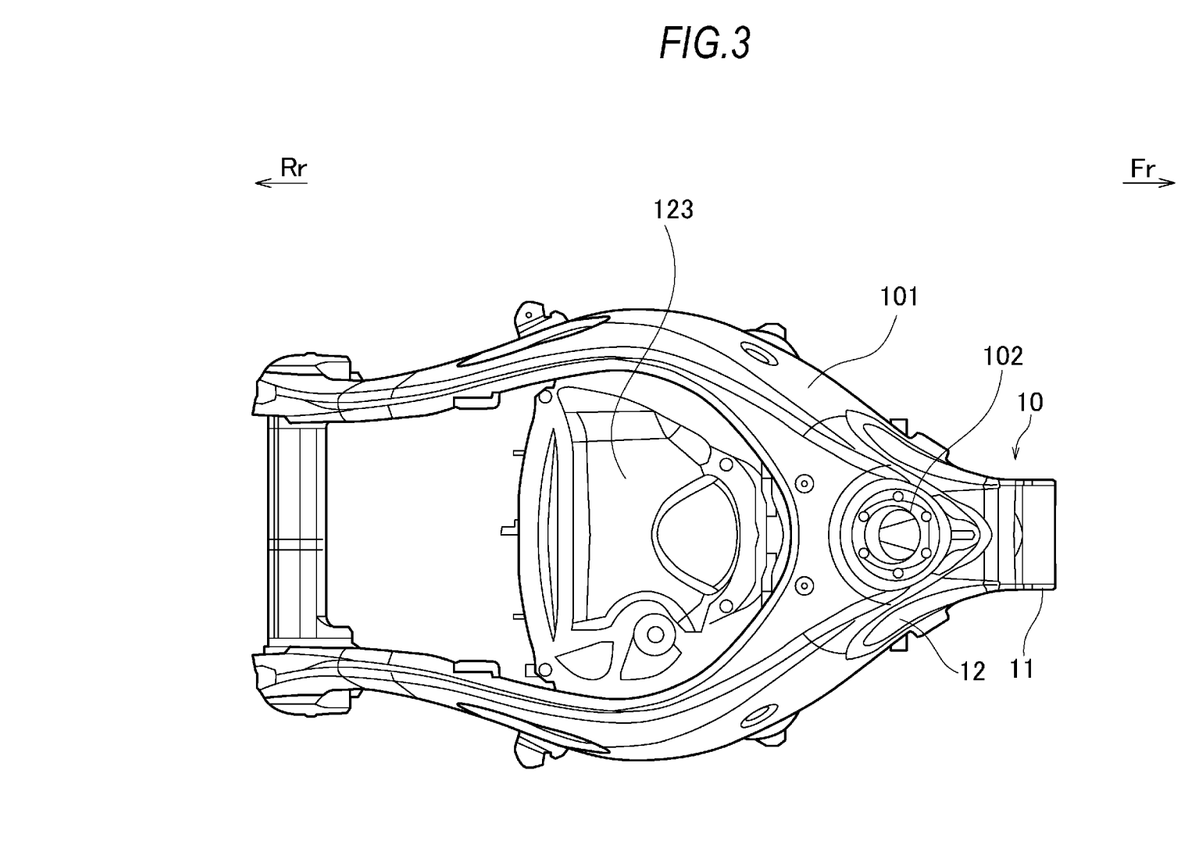
FIG. 3 is a top view of the state where the engine unit and the air cleaner are mounted on the body frame in the embodiment of the present invention.

In FIG. 2 and FIG. 3, left and right parts of the body frame 101 extend slightly downward from the steering head pipe 102 toward a rear side. As illustrated in FIG. 3, a width between left and right inner surfaces of the body frame 101 gradually and smoothly increases from the steering head pipe 102 toward the rear side, and the body frame 101 has an inner space presenting typically an egg shape or a droplet shape, thought partially. As illustrated in FIG. 2, the body frame 101 has an up and down direction width about equal to an axial-direction length of the steering head pipe 102. In the inner space formed between the left and right parts of the body frame 101 having such a shape, the air cleaner 123 is housed and disposed as illustrated in FIG. 2 and FIG. 3.

The air cleaner 123 and the engine unit 116, especially the cylinder head 116C are connected by throttle bodies forming an intake device. The air purified by the air cleaner 123 is sucked by the intake device and is supplied with the fuel from the fuel supply device, so that the air-fuel mixture with a predetermined mixture ratio is fed to an intake port of the cylinder head 116C. As is understood from FIG. 2 as well, the air cleaner 123 is located above the cylinder head 116C, and in this case, is supported afloat by the body frame 101 and so on via an elastic member such as a cushion rubber or the like, which is not illustrated. In an intake passage connecting the cylinder head intake port communicating with an engine combustion chamber and the air cleaner 123, the throttle bodies 124 are disposed in vertical posture to extend in a substantially vertical direction as illustrated in FIG. 2, that is, this example has a downdraft intake structure.

Figure 4:
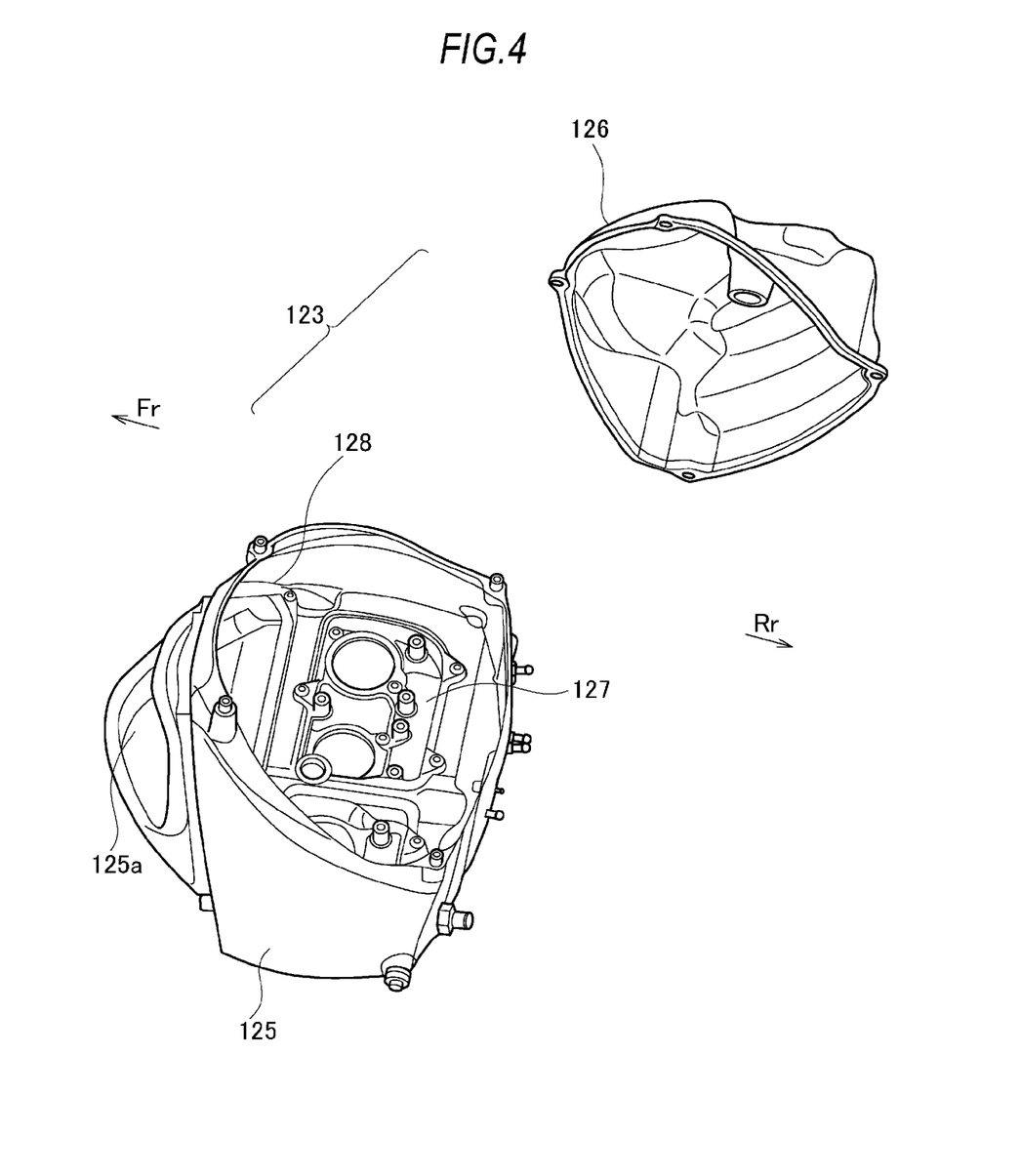
FIG. 4 is an exploded perspective view of the air cleaner according to the embodiment of the present invention.

Here, FIG. 4 illustrates a concrete structure example of the air cleaner 123 in this embodiment. The air cleaner 123 is vertically two-divided into an air cleaner main body 125 and an air cleaner upper cover 126, has a hollow structure with the both being integrally coupled, and presents roughly a deformed box shape. In a front surface of the air cleaner main body 125, an opening 125a to which a later-described intake duct is connected is provided. On a bottom surface of the air cleaner main body 125, a bottom plate 127 is disposed, and the throttle bodies 124 are coupled via the bottom plate 127. At a position closer to the opening 125a in the hollow inner portion of the air cleaner main body 125, an air filter 128 disposed to be moderately inclined upward is fit, though its detailed illustration is omitted. Incidentally, the opening 125a and the air filter 128 are both formed in a substantially trapezoidal shape with an upper base having a moderately narrow width, or in a chevron shape.

Figure 5:
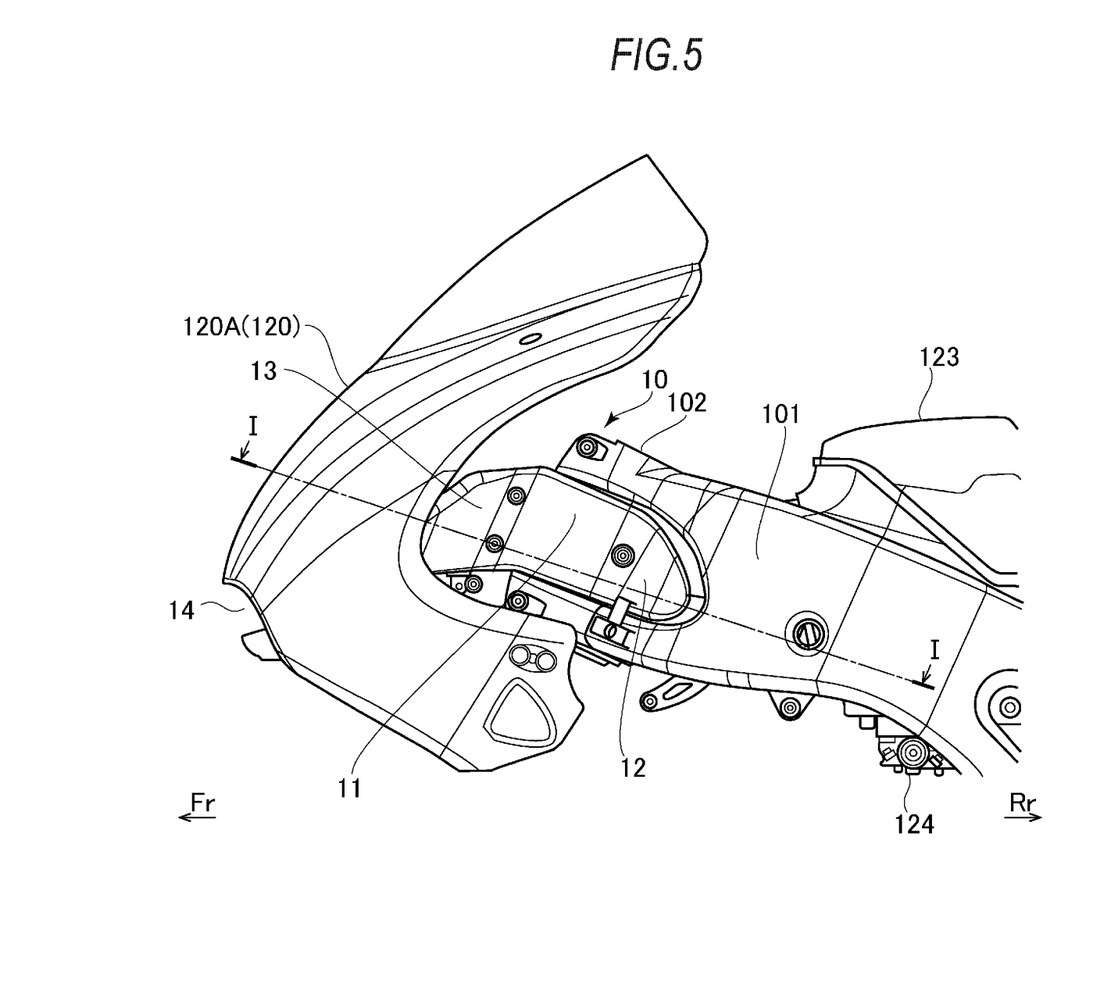
FIG. 5 is a side view illustrating the vicinity of an intake duct device in the embodiment of the present invention.
Figure 6:
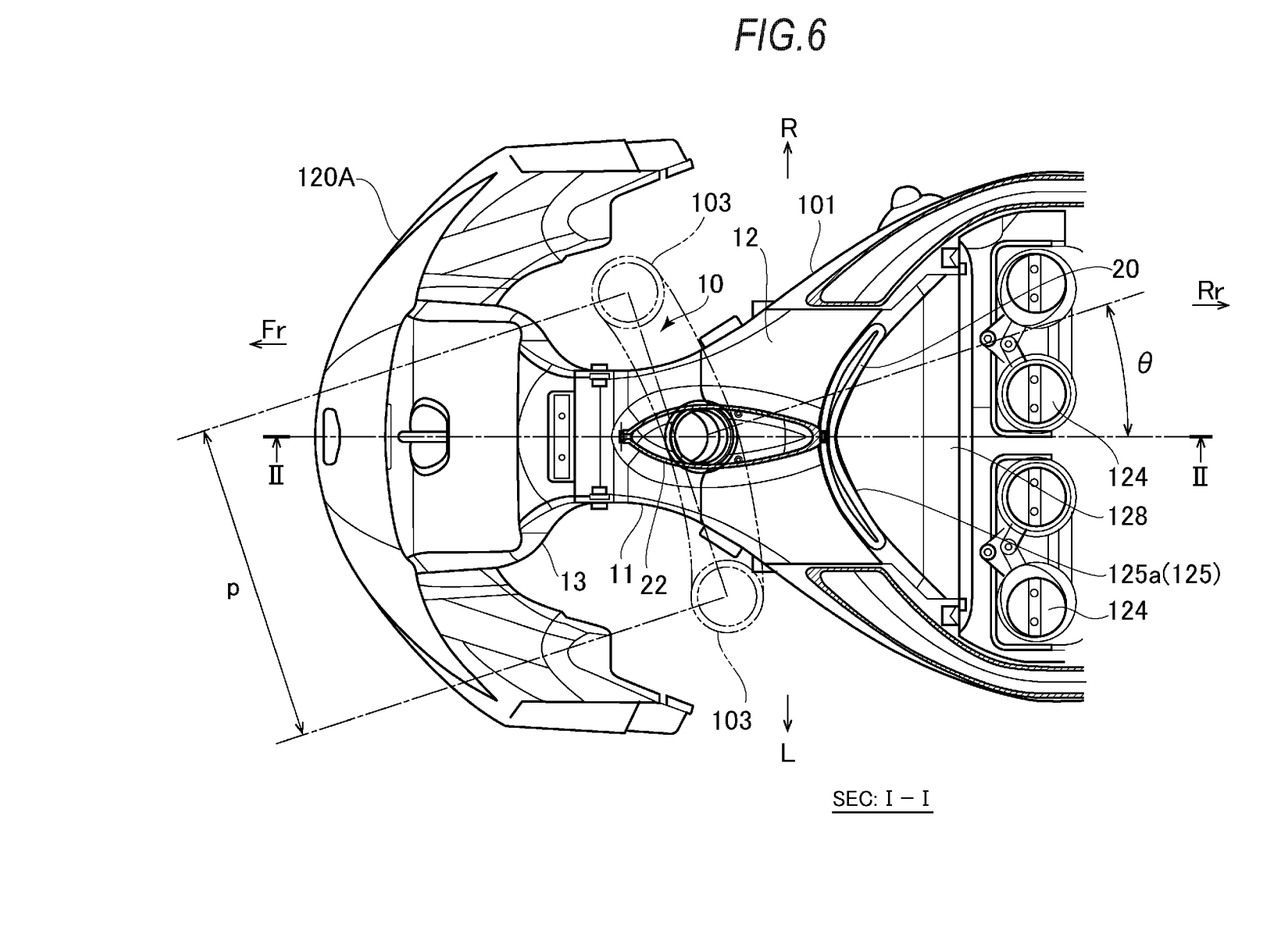
FIG. 6 is a cross-sectional view taken along I-I line in FIG. 5.
Figure 7:
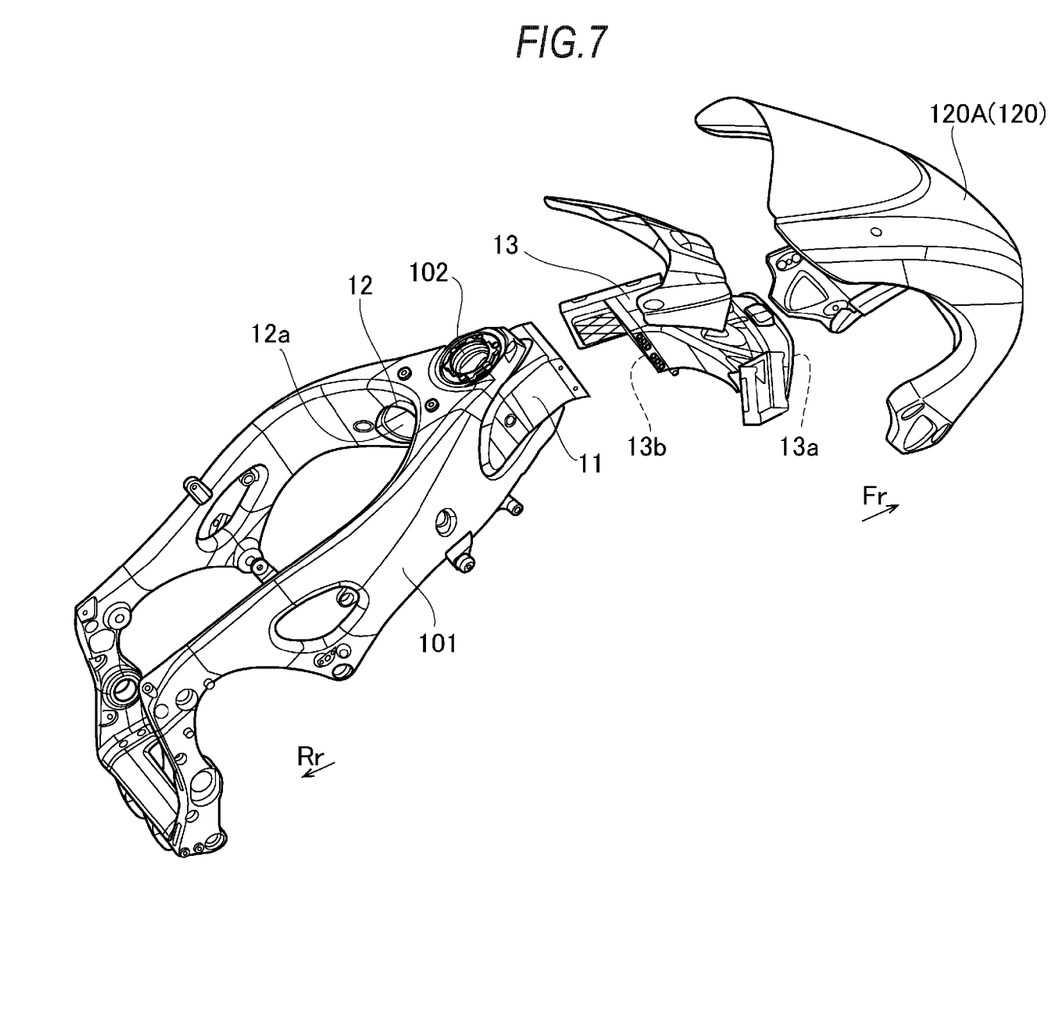
FIG. 7 is an exploded perspective view illustrating a structure example of the vicinity of the intake duct device in the embodiment of the present invention.
Figure 8:
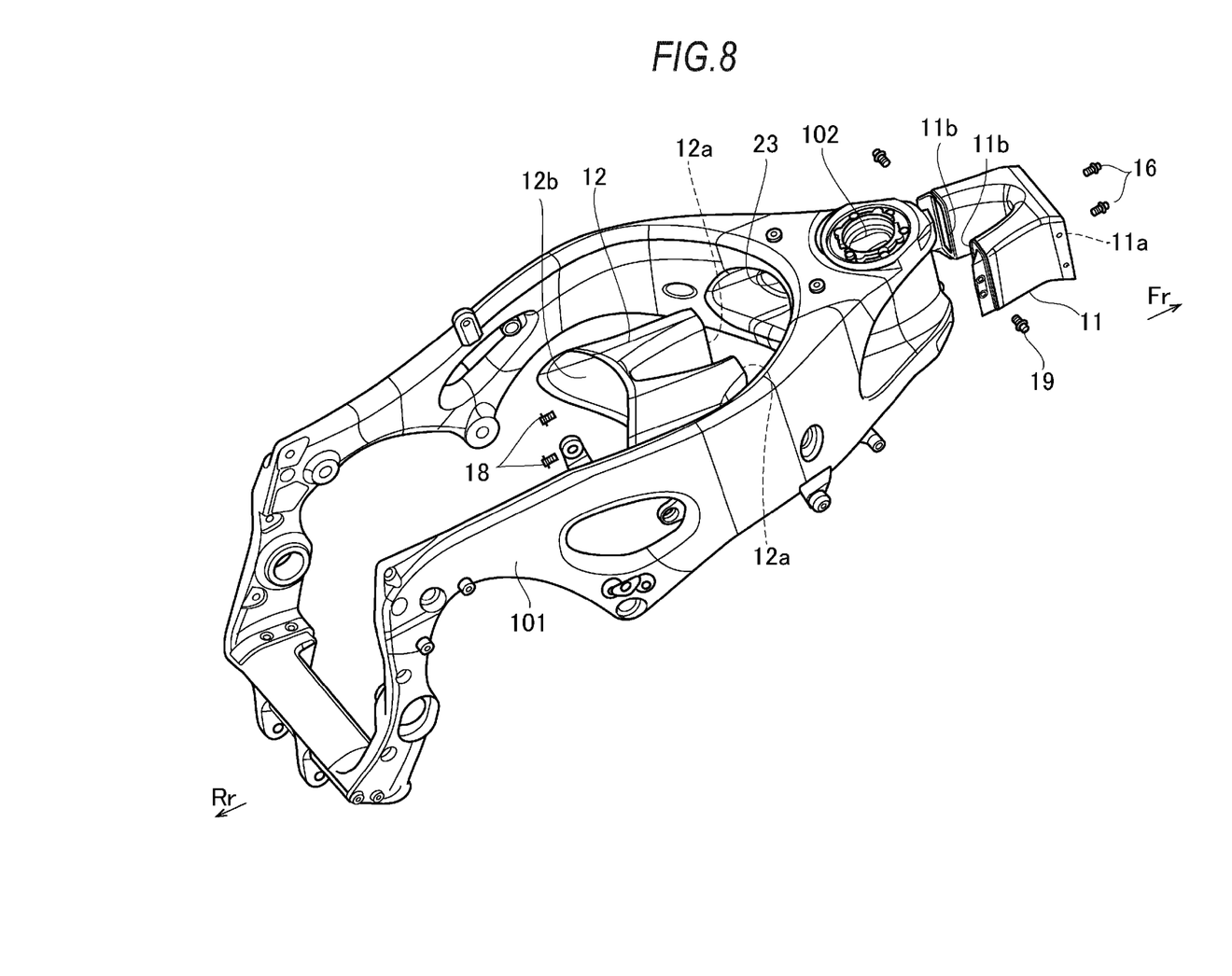
FIG. 8 is an exploded perspective view illustrating a structure example of the vicinity of the intake duct device in the embodiment of the present invention.

As illustrated in FIG. 5, the intake duct device of the present invention includes an intake duct 10 which leads the traveling air taken from the front surface of the cowling 120 (here, a front cowl 120A) to the air cleaner 123 so that the traveling air passes along both left and right side surfaces of the steering head pipe 102. This intake duct 10 is made of a separate component from the body frame 101, and is typically made of a carbon or plastic material. As illustrated in FIG. 6 to FIG. 8, the intake duct 10 is two-divided into a front intake duct 11 and a rear intake duct 12 so as to surround the steering head pipe 120 from front and rear sides, and they are fixed to the body frame 101 side by fastening.

Further, the front intake duct 11 communicates with an air inlet 14 (refer to FIG. 5) opened in the front surface of the front cowl 120A, via a fore-intake duct 13. The traveling air taken from the air inlet 14 passes along the both side surfaces of the steering head pipe 102 to be sent to the air cleaner 123 connected to a rear portion of the rear intake duct 12.

As an intake passage structure of the front intake duct 11 and the rear intake duct 12, as illustrated in FIG. 7 and FIG. 8, in the front intake duct 11, a single front opening 11a extends rearward and bifurcates into a pair of left and right rear openings 11b. Further, in the rear intake duct 12, a pair of bifurcated left and right front openings 12a extends rearward to join to a single rear opening 12b. These pairs of rear openings 11b and front openings 12a are connected to each other, and the front intake duct 11 and the rear intake duct 12 join each other so as to surround the steering head pipe 102 from the front and rear sides. Further, in the fore-intake duct 13, a single front opening 13a communicating with the air inlet 14 extends rearward to communicate with a rear opening 13b of the fore-intake duct 13 and is connected to the front opening 11a of the front intake duct 11.

Figure 9:
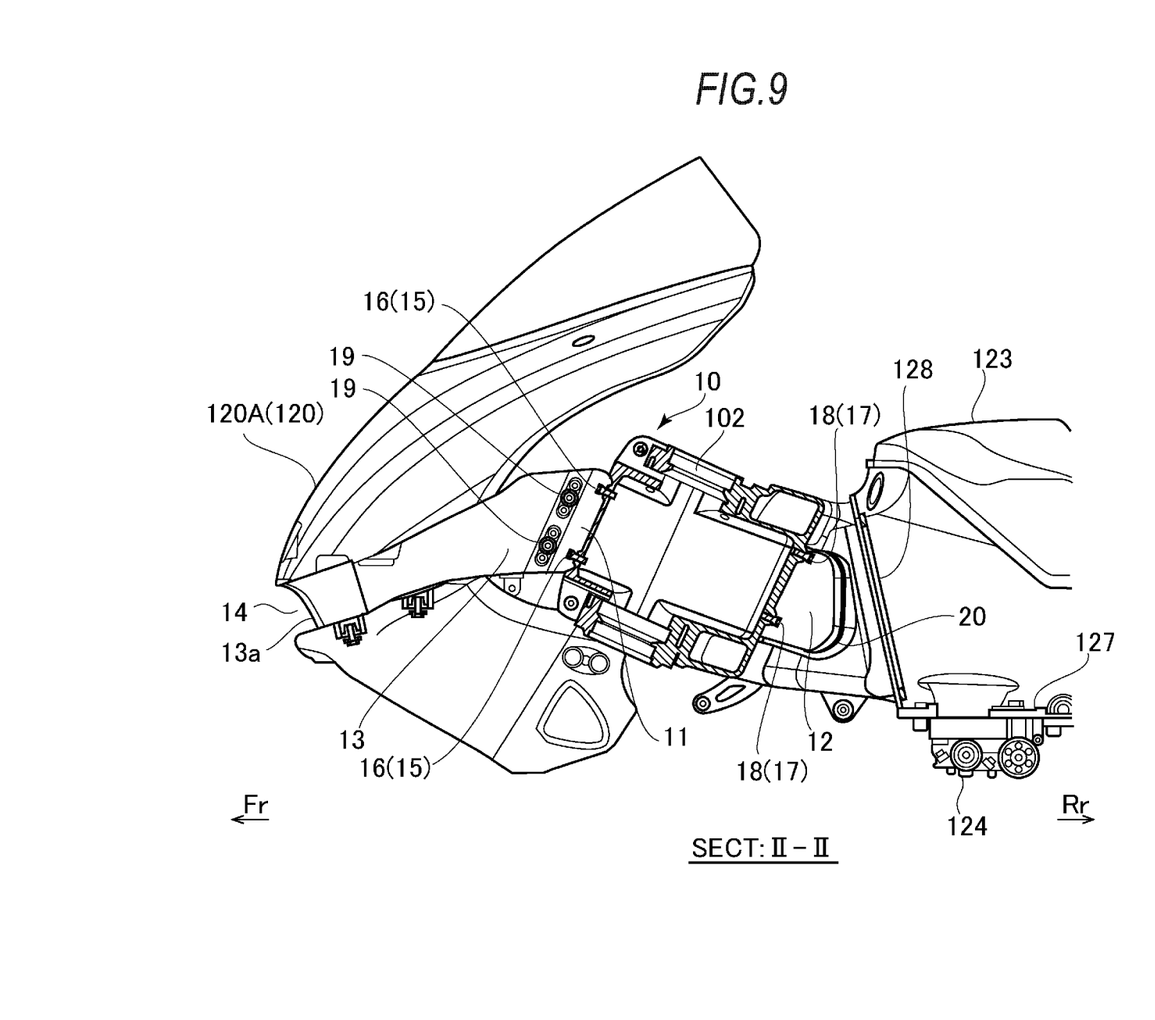
FIG. 9 is a cross-sectional view taken along II-II line in FIG. 6.
Figure 10:
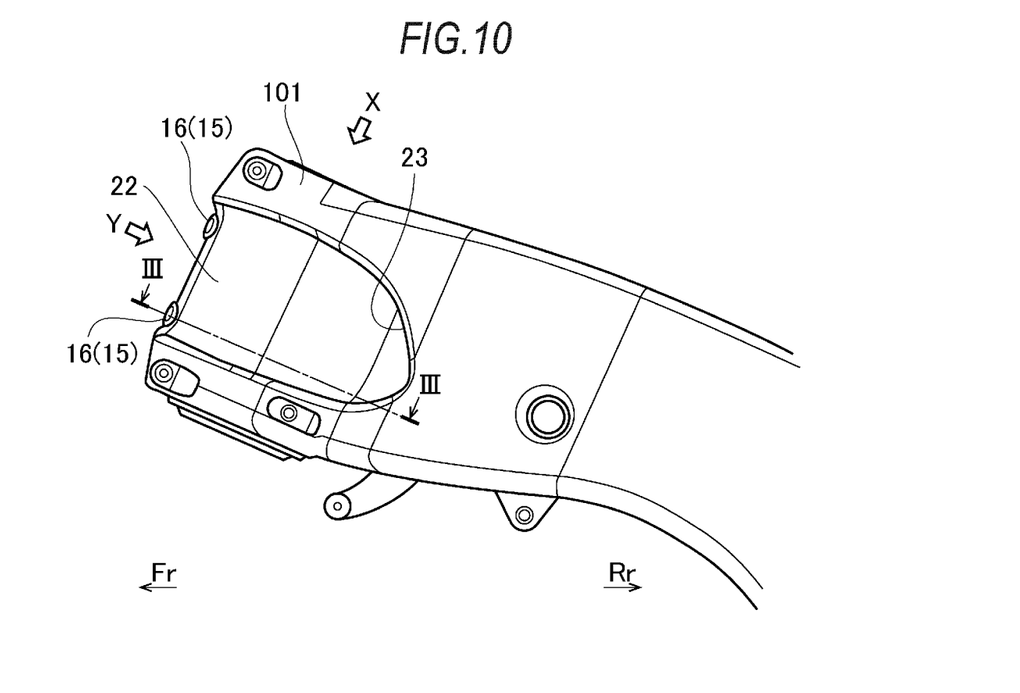
FIG. 10 is a side view illustrating the vicinity of a steering head pipe according to the embodiment of the present invention.
Figure 11:
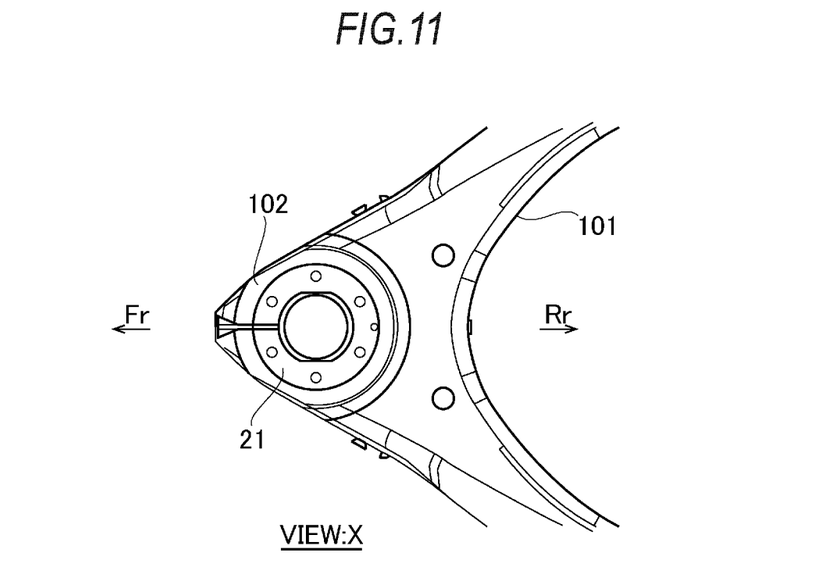
FIG. 11 is a view seen in the X arrow direction in FIG. 10.

In the above-described case, as illustrated in FIG. 9, the front intake duct 11 is fastened by screws 16 (also refer to FIG. 8) to fastening parts 15 set on a later-described support post part of the steering head pipe 102. The rear intake duct 12 is similarly fastened by screws 18 (also refer to FIG. 8) to fastening parts 17 set on the later-described support post part of the steering head pipe 102. Incidentally, the front intake duct 11 and the rear intake duct 12 are fastened to each other by screws (also refer to FIG. 8). Further, in an engagement portion between the rear intake duct 12 and the air cleaner 123, a rubber seal 20 is fit, that is, the rear opening 12b of the rear intake duct 12 is connected to the opening 125a of the air cleaner 123 (air cleaner main body 125) via the rubber seal 20 disposed along peripheral edges of these openings. In this case, the rear opening 12b of the rear intake duct 12 has an intake port shape, with the vicinity of its connection portion with the air cleaner 123 being integrally coupled to the opening 125a.

Here, as illustrated in FIG. 10 to FIG. 13, the body frame 101 has upper and lower attachment surfaces 21 for steering laces of the steering head pipe 102, the aforesaid support post part 22 supporting the steering lace attachment surfaces 21, and left and right hole parts 23 penetrating through the twin-spar body frame in the vehicle front and rear direction. Incidentally, the steering laces, though not illustrated, are members where to mount bearings for rotatably supporting a steering stem inserted in the steering head pipe 102, and are attached on upper and lower end portions of the steering head pipe 102.

Figure 12:
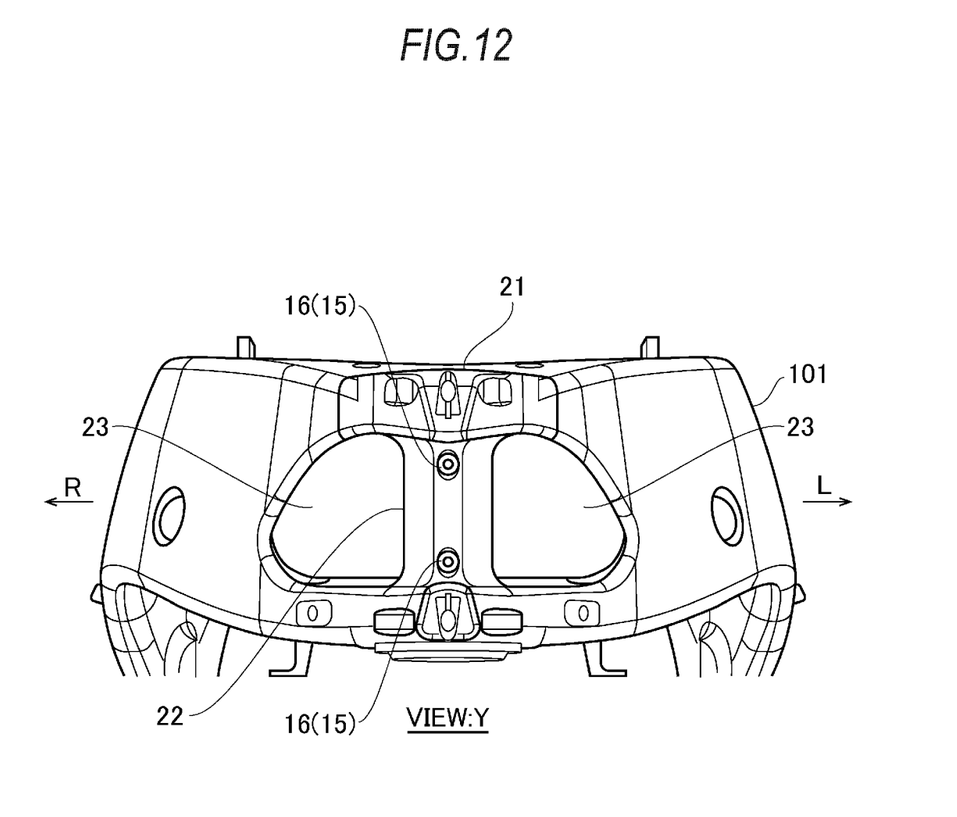
FIG. 12 is a view seen in the Y arrow direction in FIG. 10.
Figure 13:
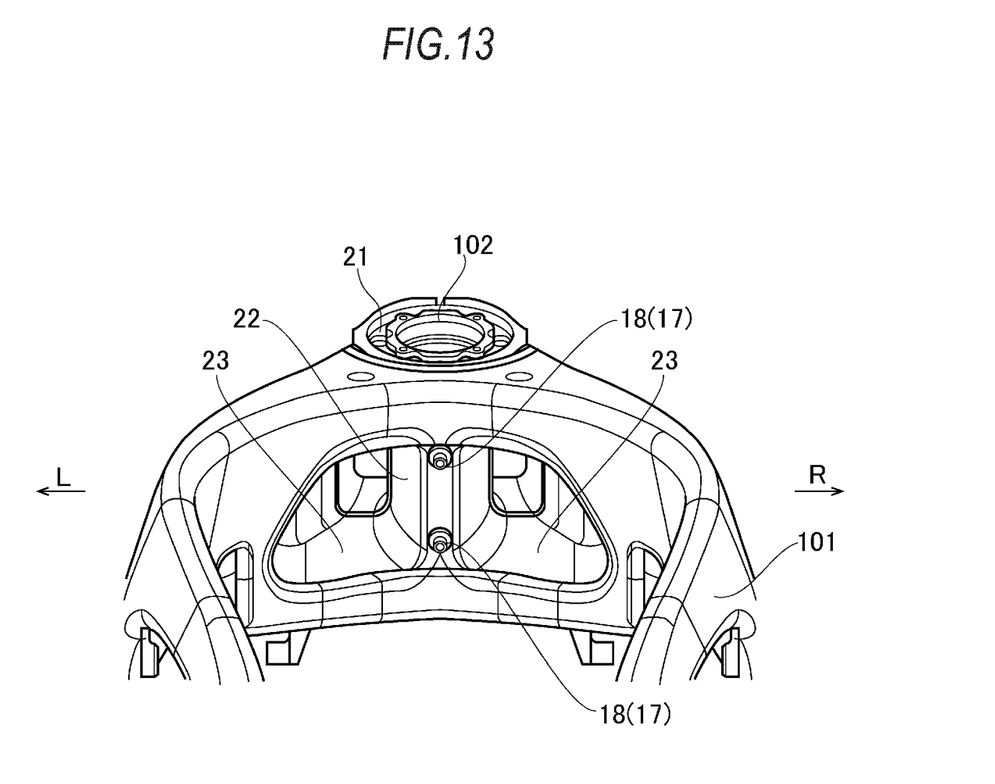
FIG. 13 is a rear perspective view illustrating the vicinity of the steering head pipe according to the embodiment of the present invention.
Figure 14:
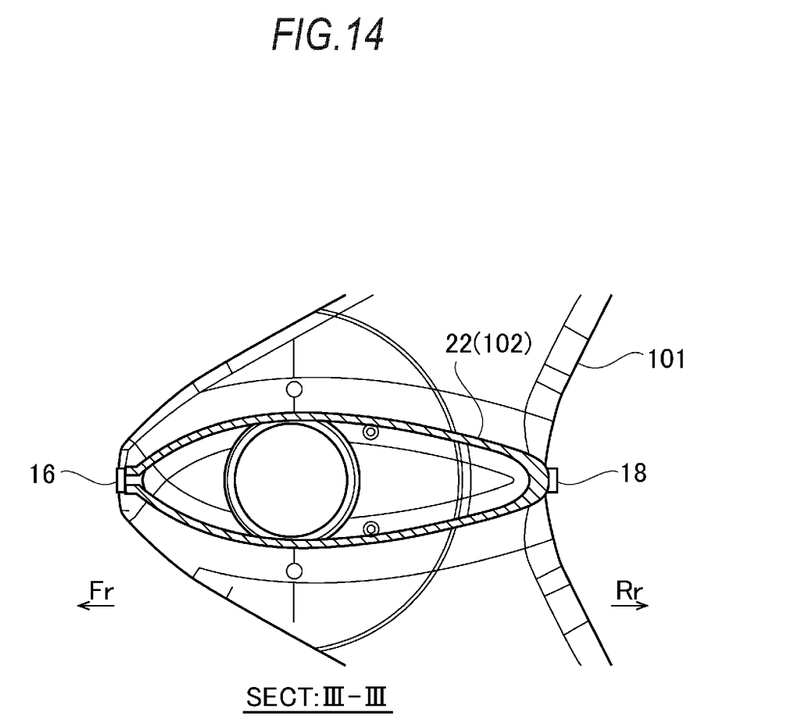
FIG. 14 is a cross-sectional view taken along III-III line in FIG. 10.

The support post part 22 has a hollow structure and has a substantially oval shape whose major axis is along the vehicle front and rear direction as illustrated in FIG. 14. On front and rear sides of the major axis of the oval shape, the aforesaid fastening parts 15, 17 are provided. Note that the fastening part 15 and the fastening part 17 are each set at two upper and lower positions (refer to FIG. 9). Via these fastening parts 15, 17, the front intake duct 11 and the rear intake duct 12 are fastened to the front side and the rear side of the support post 22 by the screws 16, 18 respectively. The hole parts 23 are formed in a tunnel shape extending in the front and rear direction, on both the left and right sides of the support post part 22 as illustrated in FIG. 12 and FIG. 13, and the aforesaid bifurcated portions of the front intake duct 11 and the rear intake duct 12 enter the tunnel-shaped hole parts 23 of the support post part 22 and the both are integrally coupled as a whole.

As previously described, the intake duct 10 bifurcates in the front intake duct 11 to left and right parts in front of the support post part 22, with the inner sides of the intake duct 10 being along the shape of the support post 22. Further, in the rear intake duct 12, the left and right parts join behind the support post part 22, and its connection portion with the air cleaner 123 (air cleaner main body 125) has an intake port shape of being integrally coupled to the air cleaner 123.

In the above-described case, a rubber seal, though its detailed illustration is omitted, is fit in an engagement portion between the front intake duct 11 and the rear intake duct 12.

Next, main operations and so on in the intake duct device of the present invention will be described. In the intake duct 10, first, the traveling air during the traveling of the vehicle is led from the air inlet 14 opened in the front surface of the front cowl 120A to the front opening 13a of the fore-intake duct 13. This traveling air is further sent to the front intake duct 11, passes along the both side surfaces of the steering head pipe 102, and is sent via the rear intake duct 12 to the air cleaner 123 connected the rear portion of the rear intake duct 12. Thus using the traveling air enhances intake efficiency to the air cleaner 123 effectively to contribute to engine power improvement and so on.

In the present invention, especially the intake duct 10 is made of a separate component from the body frame 101 as described above, and concretely, is two-divided into the front intake duct 11 and the rear intake duct 12 so as to surround the steering head pipe 102 from the front and rear sides.

By thus forming the intake duct 10 as a separate body from the body frame 101, it is possible to change a sectional area of the intake duct 10 without changing the body frame 101 itself. As illustrated in FIG. 6, in vehicles traveling on public roads, a steering angle θ is large and a fork pitch p is narrow, and the intake duct 10 has a small sectional area. Further, in racing vehicles and the like, the steering angle θ is small and the fork pitch p is wide, and thus the intake duct 10 has a large sectional area. In this case, it is possible to effectively cope with different vehicle types only by adjusting the sectional area of the intake duct 10 side.

As described above, it is possible to easily set the sectional area of the intake duct 10 according to the steering angle and the fork pitch. This eliminates a need for changing the body frame 101 when the shape of the intake duct 10 (mainly an escape shape of the front forks 103) is changed according to the specifications or the vehicle type. Therefore, a common body frame can be used for different vehicle types.

In the above-described case, by dividing the intake duct 10 in the front and rear direction into the front intake duct 11 and the rear intake duct 12, it is possible to form the intake duct shape surrounding the support post part 22 of the steering head pipe 102.

Further, the support post part 22 supporting the steering lace attachment surfaces 21 has the oval shape with its major axis being along the vehicle front and rear direction as illustrated in FIG. 14. The inner side of the intake duct 10 is formed so as to be along the oval shape of the support post part 22, and especially the front intake duct 11 branches off into the left and right parts in front of the support part 22. This branch portion tapers off toward the vehicle front side and thus is in what is called a wedge shape, and the air fed from the front opening 11a of the front intake duct 11 flows to the inside from a pointed end of the wedge shape to pass along the oval shape without any resistance. Such a flow of the intake air in the intake duct 10 has high flowability, and in this respect as well, the improvement in intake efficiency can be achieved.

Further, the branch portion of the front intake duct 11 and the joining portion of the rear intake duct 12 are fastened and fixed to the support post part 22 by the screws 16, 18 via the fastening parts 15 and the fastening parts 17 respectively. The fastening parts 15 and the fastening parts 17 are screw parts integrally molded on the front and rear sides of the support post part 22, and therefore, cost is reduced and the number of parts is reduced. Since the fastening positions of these front intake duct 11 and rear intake duct 12 are both close to front and rear end surfaces, their assemblability is extremely good, and it is possible to smoothly and properly perform an assembling work.

In the foregoing, the present invention has been described together with various embodiments, but the present invention is not limited only to these embodiments, and changes and so on can be made within the range of the present invention.

The present invention is also applicable when, in the above-described embodiment, the engine unit 116 is a multi-cylinder engine other than the four-cylinder engine, that is, for example, a parallel two-cylinder or three-cylinder engine.

According to the present invention, the intake duct is made of a separate component from the body frame, and it is possible to change the sectional area of the intake duct without changing the body frame at all. It is possible to effectively cope with different vehicle types only by adjusting the sectional area of the intake duct side.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. An intake duct device of a motorcycle in which an engine is mounted on a body frame extending slightly downward from a steering head pipe toward a vehicle rear side and an air cleaner is disposed above the engine, the intake duct device comprising:
    an intake duct which leads traveling air taken from a cowling front surface, to the air cleaner so as to make the traveling air pass along both side surfaces of the steering head pipe,
    wherein the intake duct comprises a left hole part and a right hole part in a tunnel shape extending in a vehicle front and rear direction, on both left and right sides of a support post part of the body frame,
    wherein the intake duct comprises a front intake duct and a rear intake duct, each of the front and rear intake ducts comprising bifurcated portions respectively fastened at a respective front side and a rear side of the support post part, and
    wherein the respective bifurcated portions of the front intake duct and the rear intake duct enter the tunnel-shaped left and right hole parts so as to surround the steering head pipe from the front side and the rear side of the support post part and are integrally coupled as a whole and fixed to the body frame.

2. The intake duct device of the motorcycle according to claim 1,
    wherein the front intake duct communicates with an air inlet opened in the cowling front surface via a fore-intake duct, and the taken traveling air passes along the both side surfaces of the steering head pipe to be sent to the air cleaner connected to a rear portion of the rear intake duct.

3. The intake duct device of the motorcycle according to claim 2, wherein the body frame comprises: an upper attachment surface and a lower attachment surface for steering laces of the steering head pipe; the support post part supporting the steering lace attachment surfaces; the left and the right hole parts penetrating through a twin-spar frame of the body frame in the vehicle front and rear direction, and
    wherein the support post part has an oval shape whose major axis is along the vehicle front and rear direction, fastening parts are provided on the front side and the rear side of the support post part major axis, and the front intake duct and the rear intake duct are fastened to the respective front side and rear side of the support post part via the respective fastening parts.

4. The intake duct device of the motorcycle according to claim 1, wherein the body frame comprises: an upper attachment surface and a lower attachment surface for steering laces of the steering head pipe; the support post part supporting the steering lace attachment surfaces; and the left and the right hole parts penetrating through a twin-spar frame of the body frame in the vehicle front and rear direction, and
    wherein the support post part has an oval shape whose major axis is along the vehicle front and rear direction, fastening parts are provided on the front side and the rear side of the support post part major axis, and the front intake duct and the rear intake duct are fastened to the respective front side and rear side of the support post part via the respective fastening parts.

5. The intake duct device of the motorcycle according to claim 4, wherein the intake duct branches off into the left and the right hole parts in front of the support post part, with inner sides of the intake duct being along the shape of the support post part, the left and the right hole parts join behind the support post part, and a vicinity of a connection portion of the intake duct with the air cleaner has an intake port shape of being integrally coupled to the air cleaner.

* * * * *